C. A. McCANN.
GATE.
APPLICATION FILED JUNE 16, 1919.
1,350,323.
Patented Aug. 24, 1920
2 SHEETS—SHEET 1.
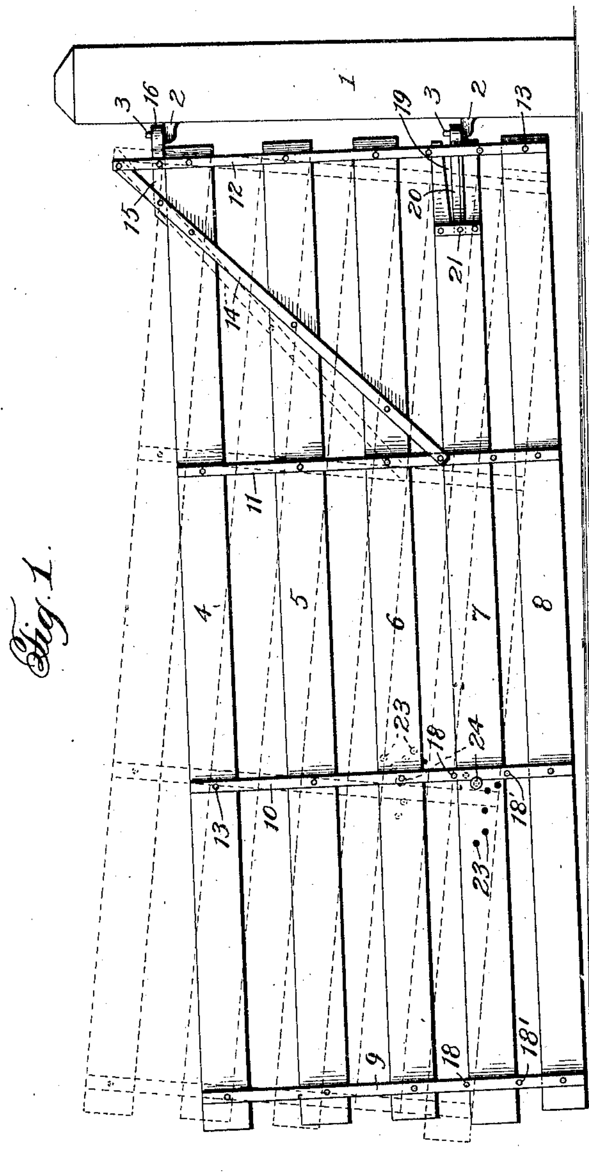
Witness:
Jas. E. Hutchinson
Inventor:
Charles A. Mc. Cann,
By Milans & Milans
Attorneys.

C. A. McCANN.
GATE.
APPLICATION FILED JUNE 16, 1919.
1,350,323.
Patented Aug. 24, 1920.
2 SHEETS—SHEET 2.
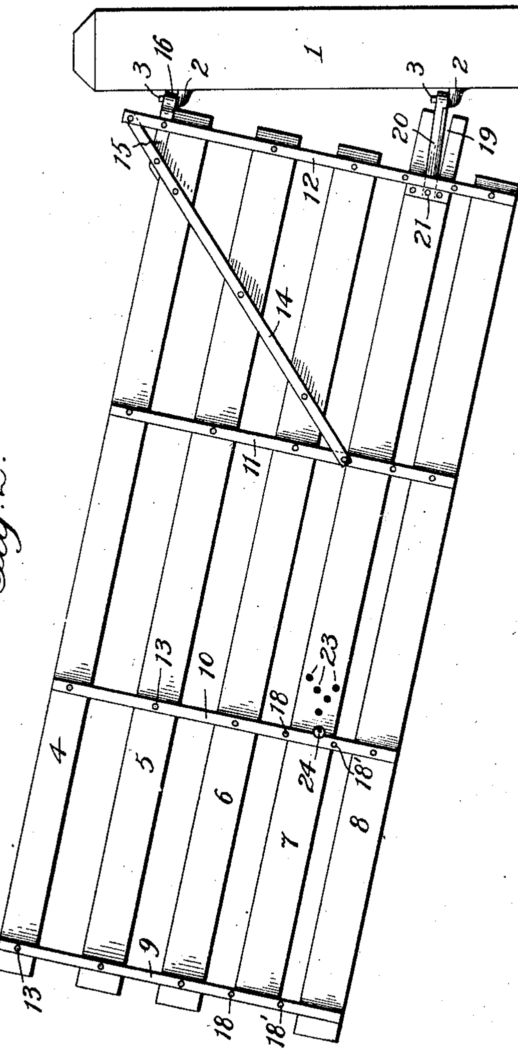
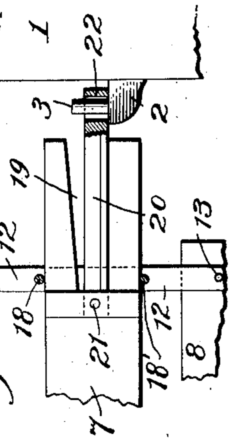
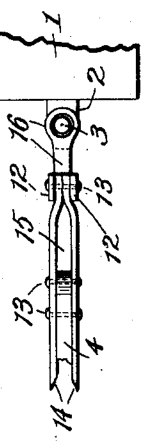
Witness:
Jas. E. Hutchinson
Inventor:
Charles A. McCann,
By Milans & Milans
Attorneys.

UNITED STATES PATENT OFFICE.

CHARLES A. McCANN, OF SPRINGFIELD, ILLINOIS.

GATE.

1,350,323. Specification of Letters Patent. Patented Aug. 24, 1920.

Application filed June 16, 1919. Serial No. 304,412.

*To all whom it may concern:*

Be it known that I, CHARLES A. McCANN, citizen of the United States, residing at Springfield, in the county of Sangamon and State of Illinois, have invented certain new and useful Improvements in Gates, of which the following is a specification, reference being had therein to the accompanying drawing.

The invention relates to improvements in gates.

In the use of farm gates, it is highly desirable to provide a gate which may be quickly adjusted vertically from time to time while on its hinges to permit small animals to pass thereunder and to allow the gate to be easily moved over an irregular surface without encountering an obstruction, or at the same time taking up any sagging or dropping of the free end of the gate without changing the location of the gate supports or materially dismantling the gate parts.

The invention therefore aims to provide a gate of this character which is free to swing upon its hinges, yet at the same time is capable of being readily adjusted vertically relative to the ground to permit the same to be raised to overcome an obstruction during the swinging thereof or to provide sufficient space to allow small animals such as chickens to pass thereunder. With this object in view, the invention preferably comprises a gate having a series of longitudinal panels, one of which is capable of a sliding adjustment relative to the gate supports, the adjustment of said panel in one direction raising the gate about its axis to lift the lower end thereof from the ground, while adjustment in the opposite direction results in lowering the lower end of the gate toward the ground.

In carrying out the invention, the gate is pivotally attached at its upper end to a support, while one of the lower panels of the gate is mounted for a sliding movement in the gate supports and has pivotally attached thereto a hinged arm adapted to be seated upon a hinge pintle constituting the hinge support for the lower side of the gate. It will therefore be seen that by moving the sliding panel horizontally the gate is swung about its upper pivot toward or from the gate support and this adjustment serves to elevate or lower the gate depending upon the direction the sliding panel is adjusted.

In the accompanying drawings, I have shown the preferred embodiment of the invention, but it will of course be understood that this disclosure is for the purpose of illustration, and that many changes may be made in the arrangement, association, and combination of parts without departing from the spirit of the invention.

In the drawings,

Figure 1 is a side elevation of the gate.

Fig. 2 is a side elevation showing the gate in one of its extreme positions; and, Figs. 3 and 4 are detail views.

Referring now more particularly to the drawings, wherein like reference characters indicate corresponding parts, the numeral 1 designates a support, which in the present disclosure is shown as a post suitably anchored in the ground and having driven therein or secured thereto the hinge members 2 formed with the hinge pintles 3, which hinge members are permanently united to the support and secured thereto at proper vertical points to constitute a swinging support for the gate to be now described.

Mounted to swing upon the support 1 is a gate shown as consisting of five spaced panels 4, 5, 6, 7 and 8, these panels being suitably spaced apart in keeping with the use of the gate, and disclosed as being of a wooden construction, but obviously they may be of any formation desired, and constructed of metal should this be preferable. The panels are supported and spaced apart by the separated sets of vertical braces 9, 10, 11 and 12, each set of braces comprising two separated metallic members extending on each side of the panels and secured to the panels 4, 5, 6 and 8 by means of the rivets 13, passing through said braces and the panels, it being here observed that the panel 7 is free for a sliding movement within the vertical braces for a reason which will later appear.

The braces 11 and 12 are further connected by the set of diagonal braces 14, one being disposed on each side of the panels 4, 5 and 6, the diagonal braces terminating at the upper end of the vertical brace 11.

The brace 12 and diagonal brace 14 near their upper ends and at a point slightly below the connection between this pair of braces are riveted to a hinge member 15 extending beyond one side of the gate and formed with an eye portion 16 having an aperture therein of a greater diameter than the diameter of the upper pintle 3, this hinge member constituting one support for the gate during its swinging movement, but permitting a slight rocking movement of the gate on the pintle when the same is to be adjusted.

In the use of farm gates it is frequently desirable to adjust the same vertically relative to the ground to overcome obstructions in the path of travel of the gate due to rough surfaces, accumulations of deposits, etc., or to permit the gate to be sufficiently raised from the ground to allow small animals to pass thereunder, and to this end the slidable panel 7 is employed, which panel is mounted for a sliding movement between the different vertical guides and the upper and lower edges are guided during their sliding movement by the rivets 18 and 18′ that pass through the vertical braces and constitute a means for guiding the panel when the same is shifted. The panel near its outer end is formed with a cutout portion 19 and pivotally secured to said panel and adapted to rise and fall in said cutout portion is a hinge arm 20, being attached to the panel by the rivet 21 constituting a hinge connection therefor passing through said arm and the panel, the free end of the hinge arm having a socket or opening 22 adapted to receive its hinge pintle 3. This arm is relatively long, and the inner vertical guides 12 are capable of a considerable movement thereon before said guides are brought into contact with the outer or inner ends of said hinge member.

The sliding panel 7 is formed with a plurality of spaced apertures 23 therein adapted to receive a locking bolt 24, which locking bolt engages or contacts with the guides 10 when the gate has been adjusted to serve in maintaining the panel in its adjusted position and to thereby hold the gate in its proper vertical position relative to the ground. This locking bolt is shown as consisting of a suitable bolt having a headed portion thereon which can be freely removed from any one of the spaced apertures 24 and placed in another to correspondingly maintain the sliding panel in its adjusted position, it being here observed that the adjustment of the panel of course moves the gate about its upper pivot point, the hinge arm 15 being formed with a socket 16 that is of sufficient diameter to allow the gate to swing its axis vertically when the sliding bar 7 is moved longitudinally.

In the use of gates of this character it is frequently desirable to adjust the lower end of the gate relative to the ground vertically to overcome obstructions in the path of the swinging movement of the gate due to irregular surfaces or accumulation of deposits on the ground and at the same time to elevate the free end of the gate if the same has a tendency to sag due to the heavy weight thereof. It is desired that this adjustment be one that can be made with ease, without changing the location of the gate supports or materially dismantling the gate elements and to this end the sliding panel 7 is utilized, it being observed that in Fig. 1 of the drawings, the gate is shown as being in its lowermost position at which time the sliding panel 7 has been moved as far as possible toward the left, bringing the right end of the gate in its nearest position relative to its support 1, the pin 24 having been inserted through the right hand hole or aperture in the panel and bearing against the vertical braces 10 to maintain the sliding panel in this position. Now, assuming that it is desired to raise the lower end of the gate in view of its dragging upon the ground, or to provide a space to permit small animals to pass thereunder, then the sliding panel 7 is shifted to the right as shown in dotted lines in Fig. 1, moving the lower end of the gate outwardly from its support upon its upper hinge connection 2, elevating the bottom panel of the gate from the rail, and bringing the sliding panel 7 in the dotted line position, whereupon the bolt 24 is inserted in the appropriate aperture in the sliding panel to maintain the panel in this position. When adjusted to this position it will be observed that the lower end of the gate is spaced a greater distance from its support than the upper end thereof, but that the same is yet supported to a material extent by the lower hinge arm 20 receiving its hinge pintle 3. The gate can be further elevated by a continued inward movement of the sliding panel 7, if such would be desirable, and in any of its positions the panel is positively held against a sliding movement to permit the gate to lower by the locking pin 24.

In the foregoing specification I have described the preferred embodiment of the invention, having illustrated the bracing for the gate panel as consisting of the separated vertical braces 9, 10, 11 and 12, but this is only shown as disclosing a convenient means for supporting the panel, but obviously any suitable form of frame may be employed that will enable certain of the panels to be rigidly held in relation thereto, while one of said panels is permitted to have a free sliding movement and directly connected to a hinge element so that the gate can be adjusted vertically without changing its hinge supports, or in any way dismantling the gate proper.

Having thus described the invention, what I claim is:

1. The combination with a gate having a frame, of a support, a panel longitudinally slidable in the frame and having a slot in one end, and an arm having one end pivotally connected to the support and the opposite end pivoted in the slot of the longitudinally slidable panel.

2. The combination with a gate having a frame, of a support, a panel longitudinally slidable in the frame and having a tapered slot in one end, and an arm having one end pivotally connected to the support and the opposite end pivoted in the tapered slot of the longitudinally slidable panel.

3. The combination with a gate having a frame, of a support, vertically spaced pins extending through the frame, a longitudinally slidable panel operating between the pins, and an arm having one end pivotally connected to the support and the opposite end pivotally connected to the slidable panel.

4. The combination with a gate having a frame, of a support, vertically spaced pins extending through the frame, a longitudinally slidable panel operating between the pins and provided with a slot in one end, and an arm having one end pivotally connected to the support and the opposite end pivotally connected in the slot of the slidable panel.

5. The combination with a gate having a frame, of a support, a plurality of pairs of vertically spaced pins extending through the frame, a longitudinally slidable panel carried by the pairs of vertically spaced pins, and an arm having one end pivotally connected to support and the opposite end pivotally connected to the slidable panel.

6. The combination with a gate having a frame, of a support, a panel longitudinally slidable in the frame and having a slot in one end and a plurality of irregularly positioned openings intermediate the ends, a bolt adapted to pass through one of the irregularly arranged openings and engage a portion of the frame, and an arm having one end pivotally connected to the support and the opposite end connected in the slot in the end of the slidable panel.

7. The combination with a gate having a frame, and a plurality of panels supported thereby, a support for said gate, and a plurality of hinge connections between said gate and support to permit a swinging thereof, one of said hinge connections including a hinge arm adapted to be secured to a gate panel, said gate panel being adjustable longitudinally of the gate to elevate or lower the gate, and means coöperating with said panel and the gatė frame to maintain the same in its adjusted position.

8. The combination with a gate having a frame, a support for said gate, a plurality of hinge connections between said gate and support to permit a swinging movement thereof, one of said hinge connections including a hinge arm, a sliding panel in said gate frame adapted to be pivotally connected to said hinge arm, said panel being formed with a plurality of apertures therein spaced apart, and a movable locking member adapted to be inserted in one of said apertures and coöperate with the gate frame for holding the panel in its different adjusted positions.

9. The combination with a gate having a frame, of a support therefor, a plurality of hinge connections between said gate and support, one of said hinge connections including a hinge arm, a movable panel carried by the gate frame and having a cutout portion in one end, said hinge arm being adapted to be pivoted to said movable panel and capable of a movement in said cutout opening, the gate panel being adjustable horizontally to elevate or lower the gate, and means coöperating with said panel and the gate frame for holding the same in the different positions of adjustment.

In testimony whereof I hereunto affix my signature in the presence of two witnesses.

CHARLES A. McCANN.

Witnesses:

W. Nuamretzer,

M. A. Ratchford.